United States Patent
Vergne et al.

(10) Patent No.: US 9,303,492 B2
(45) Date of Patent: Apr. 5, 2016

(54) DEVICE FOR ATTACHING A FIRST ELEMENT TO A RETAINING FLANGE OF A SECOND ELEMENT, ASSOCIATED INSTALLATION AND METHOD

(75) Inventors: Frédérick Vergne, Gif sur Yvette (FR); Sylvain Routeau, Saint Cloud (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/114,684

(22) PCT Filed: May 11, 2012

(86) PCT No.: PCT/EP2012/058799
§ 371 (c)(1),
(2), (4) Date: Jan. 31, 2014

(87) PCT Pub. No.: WO2012/156320
PCT Pub. Date: Nov. 22, 2012

(65) Prior Publication Data
US 2014/0138095 A1    May 22, 2014

(30) Foreign Application Priority Data
May 13, 2011   (FR) ...................................... 11 54169

(51) Int. Cl.
*E21B 19/00*   (2006.01)
*E21B 43/013*   (2006.01)
(Continued)

(52) U.S. Cl.
CPC ............. *E21B 43/013* (2013.01); *E21B 19/004* (2013.01); *E21B 19/22* (2013.01); *E21B 43/0107* (2013.01); *F16L 1/20* (2013.01); *F16L 37/127* (2013.01); *H02G 1/10* (2013.01)

(58) Field of Classification Search
CPC ... E21B 19/004; E21B 19/22; E21B 43/0107; F16L 37/127; H02G 1/10
USPC ............ 166/346, 343, 352, 360; 285/33, 406, 285/412, 320; 405/169, 170, 224.3
See application file for complete search history.

(56) References Cited

U.S. PATENT DOCUMENTS

| | | | |
|---|---|---|---|
| 3,325,190 A | * | 6/1967 | Eckert et al. ..................... 285/18 |
| 3,466,738 A | * | 9/1969 | Mount ............................ 29/525 |

(Continued)

FOREIGN PATENT DOCUMENTS

| | | |
|---|---|---|
| GB | 2 010 429 | 6/1979 |
| GB | 2 094 856 | 9/1982 |

(Continued)

OTHER PUBLICATIONS

International Search Report dated Jun. 22, 2012 issued in corresponding International Patent application No. PCT/EP2012/058799.

(Continued)

*Primary Examiner* — Matthew R Buck
(74) *Attorney, Agent, or Firm* — Ostrolenk Faber LLP

(57) ABSTRACT

The device of the present disclosure comprises a holder (80) fixed to the first element and a connection element (82) borne by the holder (80). The connection element (82) is intended to engage on the second element (24). It is mounted with radial mobility in relation to the holder (80) between a separated placement configuration and a contracted configuration for holding the connection elements (82) on the second element (24). The or each connection element (82) comprises a self-locking system (100) and a mobile catching member (102), the catching member (102) being mounted with the ability to move in the self-locking system (100). The fixing device (22) comprises an actuator (104) for moving the catching member (102) in the self-locking system (100) between a deployed position and a position in which it is retracted in the self-locking system (100).

18 Claims, 8 Drawing Sheets

(51) Int. Cl.
*E21B 43/01* (2006.01)
*E21B 19/22* (2006.01)
*F16L 1/20* (2006.01)
*H02G 1/10* (2006.01)
*F16L 37/127* (2006.01)

(56) References Cited

U.S. PATENT DOCUMENTS

| | | | | |
|---|---|---|---|---|
| 3,492,027 | A * | 1/1970 | Herring | 285/18 |
| 3,628,812 | A * | 12/1971 | Larralde et al. | 285/24 |
| 3,661,408 | A * | 5/1972 | Gibbons | 285/18 |
| 4,062,571 | A * | 12/1977 | Sicard | 285/26 |
| 4,142,740 | A * | 3/1979 | Wilms | 285/18 |
| 4,477,105 | A * | 10/1984 | Wittman et al. | 285/18 |
| 4,610,570 | A * | 9/1986 | Brockway | 405/224 |
| 4,632,432 | A * | 12/1986 | Reneau | 285/24 |
| 4,722,557 | A * | 2/1988 | Bormioli | 285/18 |
| 4,823,879 | A * | 4/1989 | Brammer et al. | 166/341 |
| 5,560,258 | A * | 10/1996 | Coffey et al. | 74/500.5 |
| 5,868,524 | A * | 2/1999 | Martin | 405/170 |
| 5,947,642 | A * | 9/1999 | Teixeira et al. | 405/195.1 |
| 6,626,470 | B1 * | 9/2003 | Appleford et al. | 285/320 |
| 6,805,382 | B2 * | 10/2004 | Jennings | 285/18 |
| 7,699,359 | B2 * | 4/2010 | Le Devehat et al. | 285/364 |
| 8,511,720 | B2 * | 8/2013 | Le Devehat et al. | 285/364 |

FOREIGN PATENT DOCUMENTS

| | | |
|---|---|---|
| GB | 2 299 637 | 10/1996 |
| WO | WO 98/23845 | 6/1998 |

OTHER PUBLICATIONS

Written Opinion dated Jun. 22, 2012 issued in corresponding International patent application No. PCT/EP2012/058799.

* cited by examiner

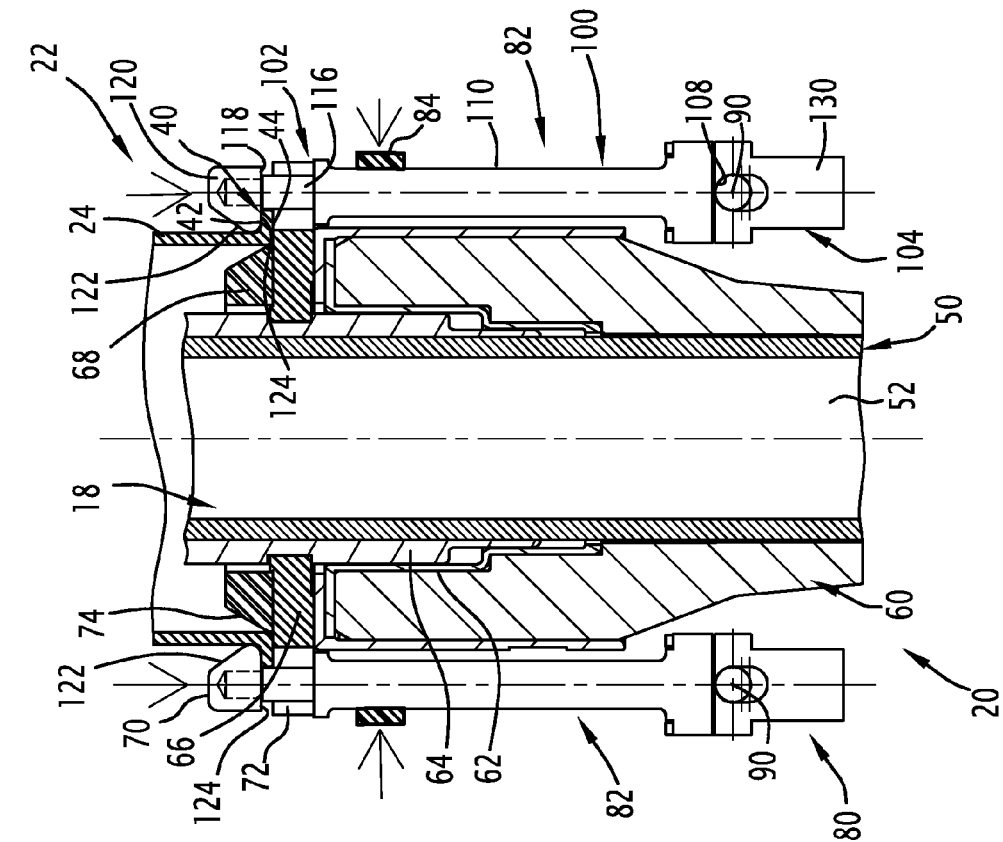

DEVICE FOR ATTACHING A FIRST ELEMENT TO A RETAINING FLANGE OF A SECOND ELEMENT, ASSOCIATED INSTALLATION AND METHOD

CROSS REFERENCE TO RELATED APPLICATIONS

The present application is a 35 U.S.C. §371 National Phase conversion of PCT/EP2012/058799, filed May 11, 2012, which claims benefit of French Application No. 11 54169, filed May 13, 2011, the disclosure of which is incorporated herein by reference. The PCT International Application was published in the French language.

TECHNICAL FIELD OF THE INVENTION

The present invention relates to a device for attaching a first element to a retaining flange of a second element, comprising:
 a holder intended to be fixed to the first element, and
 at least one connection element borne by the holder, the connection element being intended to engage on the second element, the connection element being mounted with radial mobility in relation to the holder between a separated placement configuration and a contracted configuration for holding the connection elements on the second element.

BACKGROUND OF THE INVENTION

Such a device is in particular intended to fix, on a guide tube of the "I Tube" or "J Tube" type, a bend limiter mounted on a flexible pipe. The guide tube is mounted for example secured to a floating surface assembly.

Such a device is advantageously used in a hydrocarbon exploitation installation in an expanse of water comprising a bottom assembly fixed on the bottom of the expanse of water, and a floating or submerged structure such as a naval surface support, a semi-submersible platform, a floating vertical column or a ship. The installation includes at least one flexible line connecting the bottom assembly to the structure.

The flexible line is for example a flexible fluid transport pipe, referred to as a "riser". Such pipes are for example tflexible line described in the normative documents published by the American Petroleum Institute, API 17J and API RP 17B, well known by tflexible line skilled in the art.

More generally, the flexible line may be a composite bundle or a set of electrical and/or optical cables (umbilical).

The attachment device of the aforementioned type is in particular used during installation and connection of the flexible line on the surface assembly. A device of the aforementioned type is for example described in WO 98/23845.

The flexible line described in this document is provided with a stiffener fixed on the flexible pipe by frangible pins.

An axial attachment device of the stiffener is mounted at the lower end of the hollow tube. This device comprises radially deployable hooks to allow the passage of a retaining collar for the stiffener. When the stiffener is inserted into the tube, the hooks pass below the collar and then retain the stiffener.

The flexible line may next be detached from the stiffener by breaking the frangible pins.

Such a device is not fully satisfactory. In fact, to place the hooks, it is necessary to operate on the attachment device with a plunger or a remote-controlled vehicle. Furthermore, this does not make it possible to pre-stress the locking device.

Furthermore, the locking being done by two opposite hooks, its precision is not optimal, and the device does not make it possible to offset any alignment drifts during the insertion of the stiffener into the guide tube.

One aim of the invention is therefore to obtain a device for attaching a first element to a retaining flange of a second element, in particular a retaining element for a flexible line in a guide tube that is particularly easy to use, while also being very reliable and not using any operation involving a plunger.

SUMMARY OF THE INVENTION

To that end, the invention relates to a device of the aforementioned type, characterized in that the or each connection element comprises a self-locking system and a mobile catching member, the catching member being mounted with the ability to move in the self-locking system, the attachment device comprising an actuator for moving the catching member in the self-locking system between a deployed position and a position in which it is retracted in the self-locking system.

The device according to the invention may comprise one or more of the following features, considered alone or according to all technically possible combinations:
 one from among the first element and the second element is a flexible line retaining element advantageously including a flexible line stiffener, the other among the first element and the second element being a hollow guide tube, the holder delimiting a central space for passage of the flexible line;
 the actuator is formed by a hydraulic cylinder;
 the self-locking system is mounted pivotably relative to the holder between the contracted holding configuration and the separated placement configuration;
 it includes an elastic biasing member for biasing each connection element toward the contracted holding configuration;
 the self-locking system is mounted axially movably relative to the holder between a lower position and an upper position along a local axis of the holder, in particular a local passage axis of the flexible line in the holder;
 one of the holder and the self-locking system includes a stop, the other of the holder and the self-locking system delimiting an oblong passage for receiving the stop;
 the catching member includes an engagement head on the retaining flange of the second element, the engagement head having an inclined face capable of cooperating with a surface of the second element to move the connection element away from its contracted holding configuration toward its separated placement configuration;
 it includes a multiple connection elements angularly distributed around the holder;
 at least one connection element includes multiple self-locking systems mounted movably jointly during the passage of the connection element between the separated placement configuration and the contracted holding configuration, the catching member including at least one rod received in each self-locking system;
 it includes at least one deployable member for radially separating the or each connection element toward its separated configuration intended to be positioned between the flexible line and the or each connection element;
 the catching member comprises a piston-forming rod movably mounted in the self-locking system and a catching head fixed to the free end of the rod, the self-locking system by default keeping the rod of each catching member in position by mechanical cooperation;

the self-locking system comprises a substantially cylindrical barrel delimiting a cylindrical cavity for axial guiding of the catching member, the rod having a transverse section slightly larger than the transverse section of the cavity of the barrel;

in the absence of hydraulic pressure in the barrel, the rod is kept immobile in position relative to the barrel, the movement of the rod and the catching member being authorized when hydraulic pressure is provided in the cavity.

The invention also relates to an installation for exploiting a fluid through an expanse of water, characterized in that it comprises:

a hollow guide tube;

a flexible line intended to be inserted into the hollow tube, the flexible line bearing a retaining element having a retaining flange positioned at its lower end;

a device as defined above, the holder being fixed on one of the retaining element and the guide tube.

The installation according to the invention may comprise one or more of the following features, considered alone or according to any technically possible combination(s):

the retaining element includes a docking flange intended to be kept in contact with the retaining flange, when the connection elements are in their contracted holding configuration and when the attachment member is in its retracted position.

The invention also relates to a method for axially attaching a first element, in particular an element for retaining a flexible line, on a second element, in particular a hollow tube, including the following steps:

providing an attachment device as described above, the holder being fixed on the first element;

bringing the first element into the vicinity of the retaining flange of the second element;

transitioning each connection element in its placement configuration into its contracted holding configuration, then moving the attachment member into its retracted position, bearing on the second element.

The method according to the invention may comprise one or more of the following features, considered alone or according to any technically possible combination(s):

when the first element is brought into the vicinity of the retaining flange of the second element, it includes the passage of each connection element from the contracted configuration to the separated configuration.

BRIEF DESCRIPTION OF THE DRAWINGS

The invention will be better understood upon reading the following description, provided solely as an example, and done in reference to the appended drawings, in which:

FIG. 7 is a view similar to FIG. 5 in a second phase of the connection;

FIG. 8 is a view similar to FIG. 5, during locking of the stiffener on the guide tube;

DESCRIPTION OF PREFERRED EMBODIMENTS

Hereinafter, the terms "upstream" and "downstream" are generally understood relative to the normal direction of circulation of a fluid in a pipe.

Figure 1:
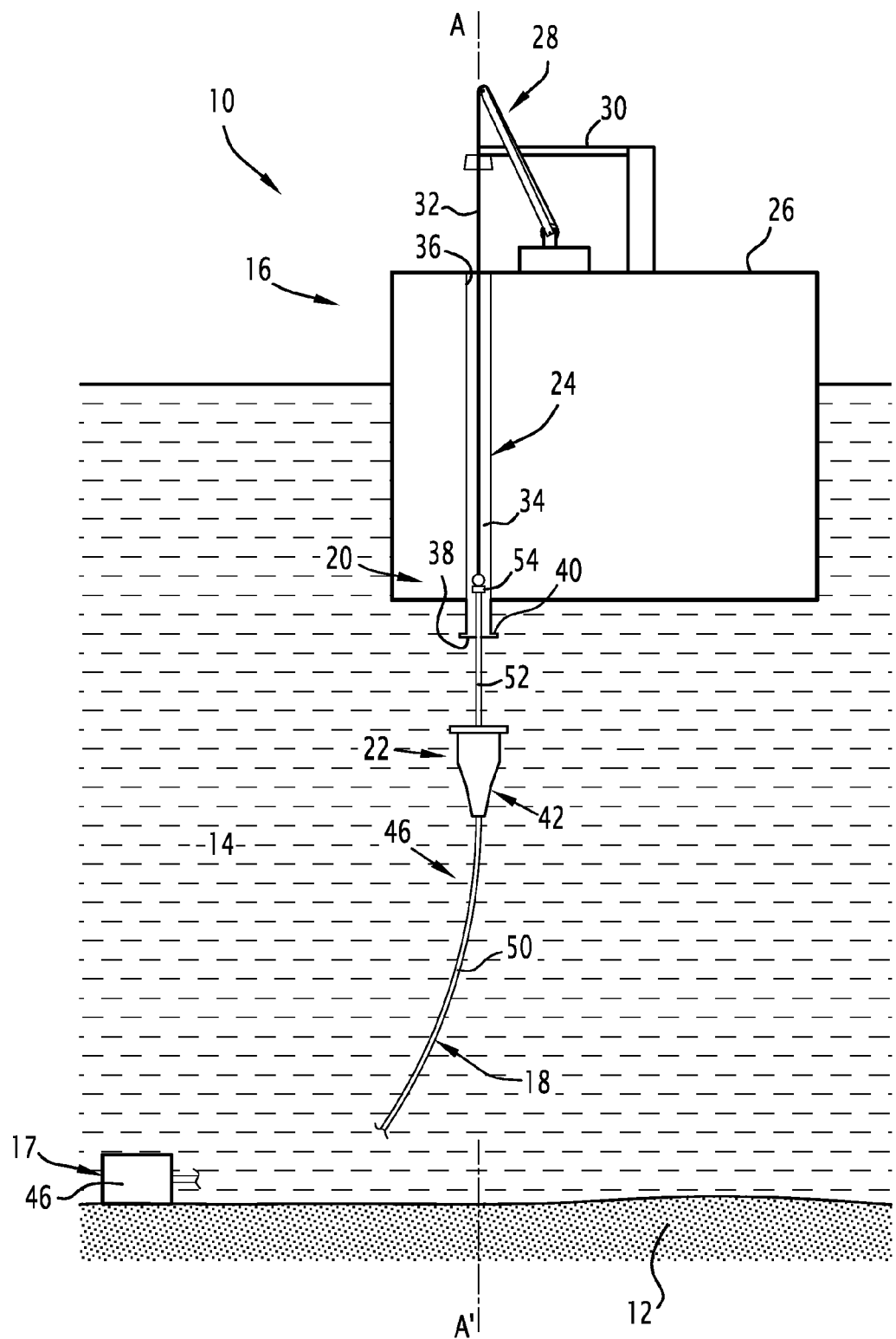
FIG. 1 is a diagrammatic partial cross-sectional view along a vertical plane of the fluid exploitation installation, including a device for fixing a flexible line stiffener on a hollow guide tube according to the invention.

A first fluid exploitation installation 10 according to the invention is shown in FIG. 1. This installation 10 is for example intended to collect a fluid, in particular hydrocarbons taken from the bottom 12 of an expanse of water 14.

The installation 10 includes a surface assembly 16 floating on the expanse of water 14, a bottom assembly 17 positioned on the bottom 12 of the expanse of water 14, and a flexible line 18 intended to connect the surface assembly 16 to the bottom assembly 17, the flexible line 18 being provided with a first retaining and/or guide element 20 attached on the flexible line 18.

The installation 10 further includes a first device 22 for attaching the retaining element 20 on a second element formed by a guide tube 24 present on the surface assembly 16.

The expanse of water 14 is for example a lake, sea or ocean. The depth of the expanse of water 14 at the surface assembly 16 is for example comprised between 15 m and 3,000 m.

The surface assembly 16 is for example a naval surface support, a semi-submersible platform, a floating vertical column (referred to as a "SPAR") or a ship. Alternatively, the surfaces assembly 16 is a rigid structure of the "jacket" type or an oscillating structure securely fixed to the sea bottom.

Also alternatively, the assembly 16 is completely submerged below the surface of the expanse of water 14.

Alternatively, the assembly 16 may be connected above the surface of the water, in the open air.

The surface assembly 16 has an upper surface 26 on which a handling vehicle 28 of the flexible line 18 is mounted.

The surface assembly 16 comprises at least one manifold 30 suitable for connecting an upper end of the flexible line 18.

The handling vehicle 28 is for example formed by a winch including a cable 32 intended to pull the flexible line 18 through the expanse of water 14 and through the guide tube 24.

In the example illustrated in FIG. 1, the guide tube 24 is a straight tube of the "I-tube" type. Alternatively, the tube 24 is a tube of the "J-tube" type, which has a bent lower end. The tube 24 delimits an inner passage 34 for circulation of the flexible line 18.

At its upper end 36, it emerges above the expanse of water 14, and at its lower end 38 in the expanse of water 14. The tube 24 is provided, in the vicinity of its lower end 38, with a retaining flange 40 protruding radially away from the axis A-A' of the tube.

Figure 2:
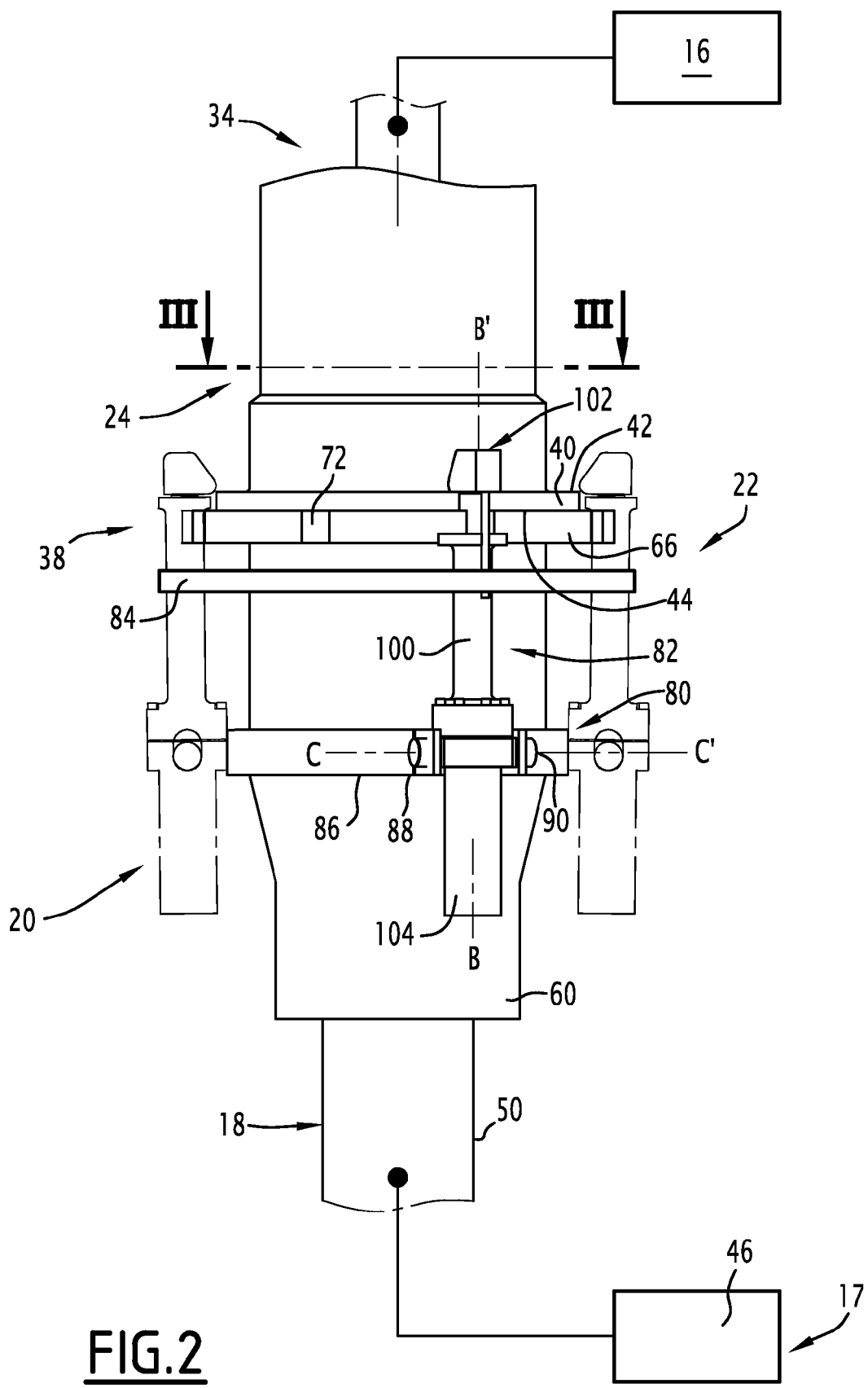
FIG. 2 is a side view of the attachment device according to the invention.
Figure 4:
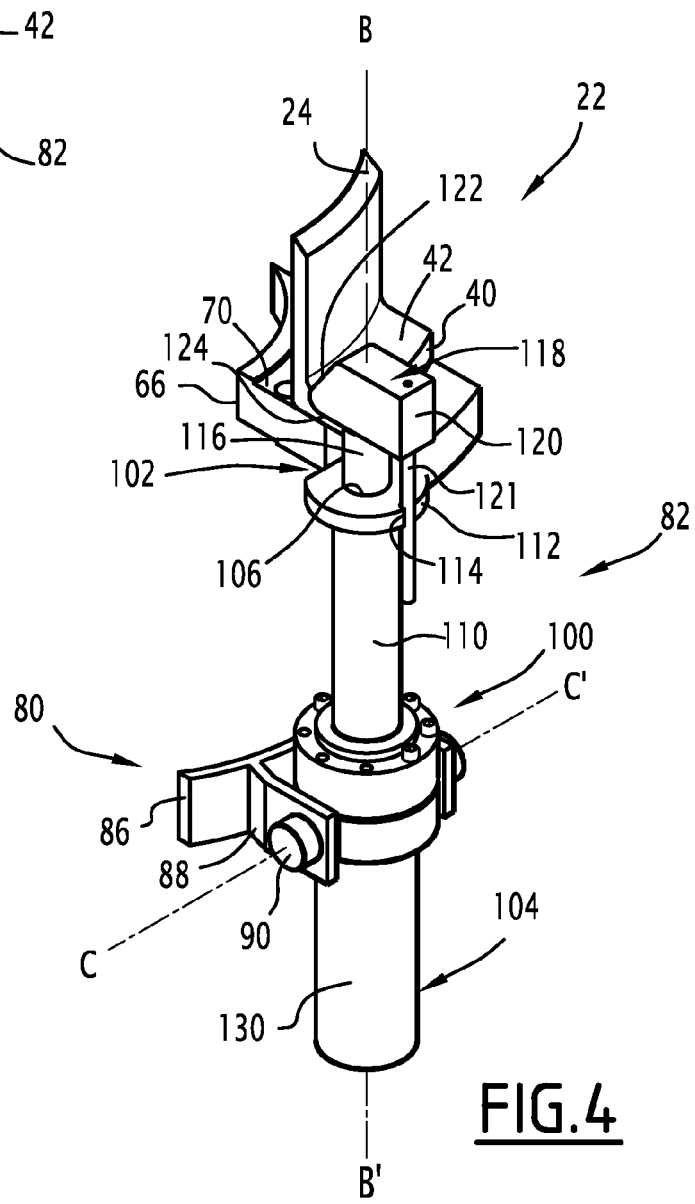
FIG. 4 is a partial three-quarters front perspective view of a connection device for the attachment device shown in FIG. 2.
Figure 5:
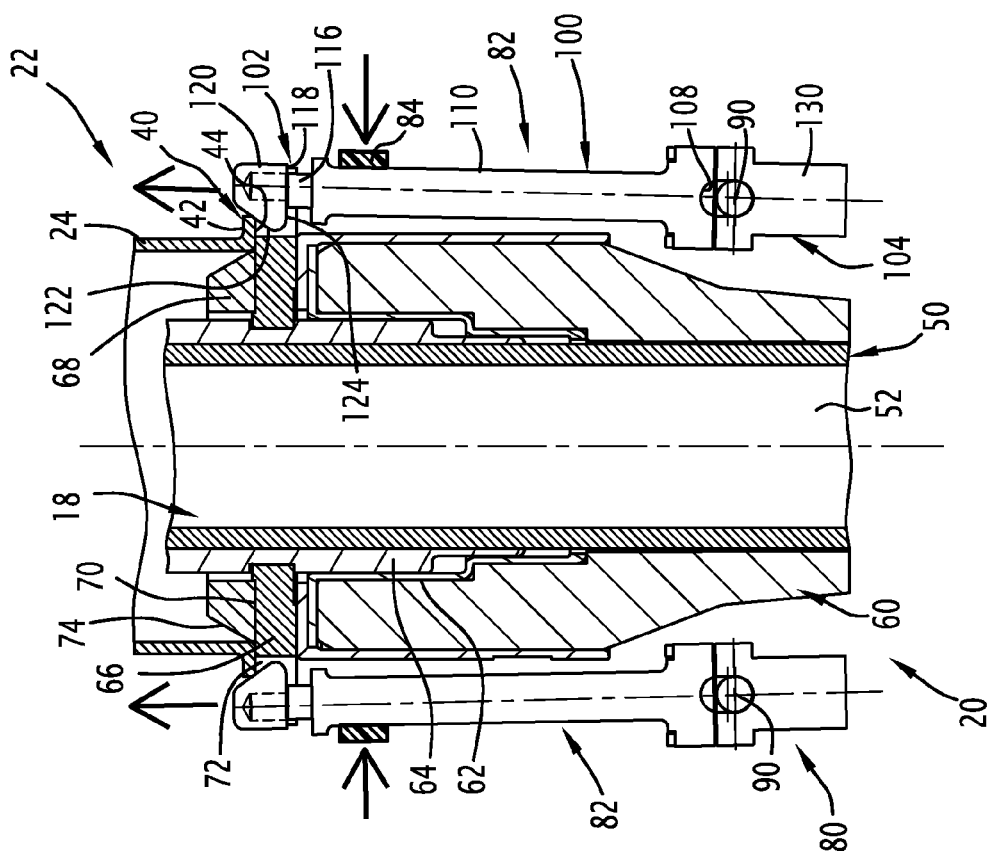
FIG. 5 is a cross-sectional view along a median vertical plane of the attachment device, during docking of a stiffener at the lower end of the guide tube.

As illustrated by FIGS. 2, 4 and 5, the flange 40 defines an upper surface 42 for catching the attachment device 22 and an annular lower docking surface 44 for the holding element 20, shown in FIG. 4.

In reference to FIG. 1, the bottom assembly 17 includes fluid collection means 46. A lower end of the flexible line 18 is connected to the collection means 46.

In the example shown in the figures, the flexible line 18 is in the form of a flexible tubular pipe 50 inwardly delimiting a fluid circulation channel 52. The pipe 50 is also called a "riser" and is intended to hydraulically connect the collecting means 46 situated at the bottom of the expanse of water to the manifold 30 situated on the surface assembly 16.

Such a flexible pipe 50 is for example described in the normative documents published by the American Petroleum Institute, API 17J and API RP 17B, well known by tflexible line skilled in the art.

In one alternative, the flexible line 18 is a composite bundle of the umbilical or "integrated service umbilical" (ISU) type.

Alternatively, the flexible line 18 may be a bundle of electrical and/or optical cables and/or a bundle of hydraulic lines.

At its upper end, the flexible line 18 in this example includes a connecting head 54 intended to be connected to the handling vehicle 28, then to the manifold 30.

The flexible line 18 is for example unwound and submerged in the expanse of water 14 from a surface ship, or is stored on the bottom 12 of the expanse of water 14.

The retaining element 20 forms a bend limiter capable of preventing excessive torsion of the flexible line 18 capable of causing deterioration of the flexible line 18.

This retaining element 20 includes, from top to bottom in FIG. 5, a stiffener 60, a jacket 62 for reinforcing the stiffener 60, a sleeve 64 for insertion of the flexible line 18, and a docking flange 66 on the tube 24.

The retaining element 20 further includes a docking member 68 (or center member) and means (not shown) for securing the flexible line 18 on the retaining element 20.

Figure 3:
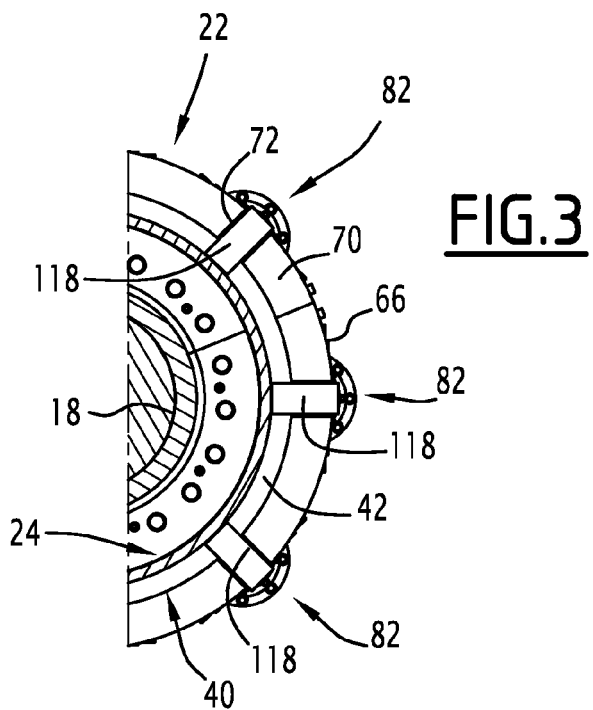
FIG. 3 is a partial cross-sectional view along a vertical plane III of the device illustrated in FIG. 2.

The stiffener 60 is formed by an annular block with vertical axis A-A' in FIG. 3, corresponding to the local axis of the flexible line 18. This block is for example molded from a plastic material such as polyurethane. Its upper end is covered by the reinforcing jacket 62, which partially covers the inner surface, the upper surface, and the outer surface of the block.

The stiffener 60 has a partial tapered shape converging downward. The stiffener 60 and the jacket 62 impose, on the flexible line 18, a curve radius greater than the minimum curve radius that that flexible line 18 could occupy in the region where the flexible line 18 is inserted in the stiffener 60.

The sleeve 64 protrudes upward from the reinforcing jacket 62.

It has an inner diameter substantially conjugated to the outer diameter of the flexible line 18.

The docking flange 66 protrudes radially from the sleeve 64. It is for example fixed in an annular groove formed in the outer peripheral surface of the sleeve 64. The docking flange 66 delimits an upper docking surface 70 on the lower surface 44 of the retaining flange 40.

As illustrated by FIGS. 2 and 3, the docking flange 66 may have multiple radial notches 72 outwardly emerging to receive connection elements of the attachment device 22. The radial notches 72 are distributed angularly around the axis A-A' at the periphery of the flange 66.

The docking member 68 is formed by an ring positioned on the flange 66. It has a substantially tapered shape and delimits a surface 74 converging toward the axis A-A' moving upward.

The securing means are for example means capable of axially holding the flexible line 18 in the element 20 in a releasable manner. These means are for example frangible pins or a reversible holding assembly as described in WO 2009/092,933 or a releasable nut system. Alternatively, the securing means are permanent attachment means and the flexible line is permanently attached on the retaining element 20 by cables, for example.

In reference to FIGS. 2 to 8, the attachment device 22 includes a holder 80 which, in this example, is secured to the retaining element 20, and multiple connection elements 82 movably mounted on the holder 80.

As illustrated by FIGS. 2 and 5, the device 22 further includes a member 84 for elastically biasing the connection elements 82.

In the example shown in FIGS. 2 to 4, the holder 80 bears multiple connection elements 82 angularly distributed on its periphery.

The connection elements 82 are radially movable by pivoting around an axis C-C' perpendicular to the axis A-A' between a separated placement configuration and a contracted holding configuration. Furthermore, in the example illustrated in the figures, each connection element 82 is axially movable relative to the holder 80 over a given travel between an upper position and a lower position.

In reference to FIG. 4, the holder 80 includes a peripheral ring 86 with axis A-A' and, for each connection element 82, a retaining yoke 88 and a hinge pin 90 mounted transversely through the yoke 88.

The holder 80 thus delimits a central space with axis A-A' through which the flexible line 18 passes.

As illustrated by FIG. 4, the yoke 88 protrudes radially outward from the ring 86. The pin 90 extends perpendicular to a radial axis relative to the axis A-A'.

In the example shown in FIGS. 2 to 7, each connection element 82 includes a guide formed by a self-locking system 100 movably mounted on the holder 80, a catching member 102 movably mounted in the self-locking system 100 between a deployed position and a retracted position, and an actuator 104 for moving the catching member 102 between its deployed position and its retracted position.

The self-locking system 100 is mounted rotating around an axis C-C' on a yoke 88 of the holder 80 around the pin 90. It defines a cylindrical cavity 106 for axial guiding of the catching member 102 and an oblong passage 108 for axial guiding of the guide 100, shown in FIG. 5. The pin 90 is inserted in the passage 108.

In this example, the self-locking system 100 includes a substantially cylindrical barrel 110 delimiting the cavity 106. The cavity 106 emerges at the free end of the barrel 110 at an end collar 112. The collar 112 delimits a notch 114 for angular indexing of the catching member 102.

The catching member 102 includes a piston-forming rod 116 movably mounted in the self-locking system 100 and a catching head 118 fixed to the free end of the rod 116.

As illustrated by FIGS. 4 and 5, the head 118 includes a stop 120 and an angular indexing finger 121 received in the notch 114.

The stop 120 has an inclined face that defines a lateral divergent surface 122 extending toward the axis A-A'. The surface 122 allows guiding of the catching member 102 during its docking on the guide tube 24.

The stop 120 further defines a lower catching surface 124 intended to press on the upper surface 42 of the bearing skirt 40.

The finger 121 is received in the notch 114 to angularly block the catching member 102 around its movement axis B-B' in the self-locking system.

The catching member 102 is movable in the self-locking system 100 along the axis B-B' between a retracted position, shown in FIG. 5, and a deployed position, shown in FIG. 7.

The catching member 102 is capable of occupying, between its deployed position and its retracted position, at least one intermediate position in terms of travel illustrated in FIG. 8.

In the retracted position, the rod length 116 positioned outside the cavity 106 is minimal. The head 118 is situated relative to the vicinity of the free end of the self-locking system 100. In the deployed position, the rod 116 is partially removed outside the cavity 106 of the self-locking system 100 and the rod length 116 removed outside the cavity 106 is maximal.

In this embodiment, the elastic biasing member 84 is formed by a circumferential elastic band surrounding the connection elements 82 around the axis A-A'.

The elastic biasing member 84 is capable of continuously exerting a radial biasing force on each connection element 82 toward its contracted holding configuration.

The elastic band is for example pressed radially on the outside of each guide 100.

The actuator 104 includes a movement cylinder 130, capable of acting on the rod 116 of each catching member 102. The cylinder 130 is advantageously a hydraulic cylinder controlled remotely by a hydraulic power station preferably situated on the surface.

The hydraulic power station is connected to the cylinder 130 by independent hydraulic lines. The maneuvering of the cylinder 130 and the movement of the catching members 102 can therefore be done from the surface, without it being necessary to lower a diver or a remote controlled vehicle outside the area of the surface assembly.

In one advantageous alternative, the self-locking system by default keeps the rod 116 of each catching member 102 in position by mechanical cooperation.

To that end, the rod 116 has a transverse section slightly larger than the transverse section of the cavity 106 of the barrel.

When there is no hydraulic pressure in the barrel 110, the rod 116 is therefore kept immobile in position relative to the barrel 110 along the axis B-B'.

To allow the movement of the rod 116, and more generally the catching member 102 under the effect of the cylinder 130, hydraulic pressure is provided in the cavity 106, thus allowing the movement of the rod 116.

In this case, the cylinder 130 may be positioned online below the self-locking system 100.

Figure 12:
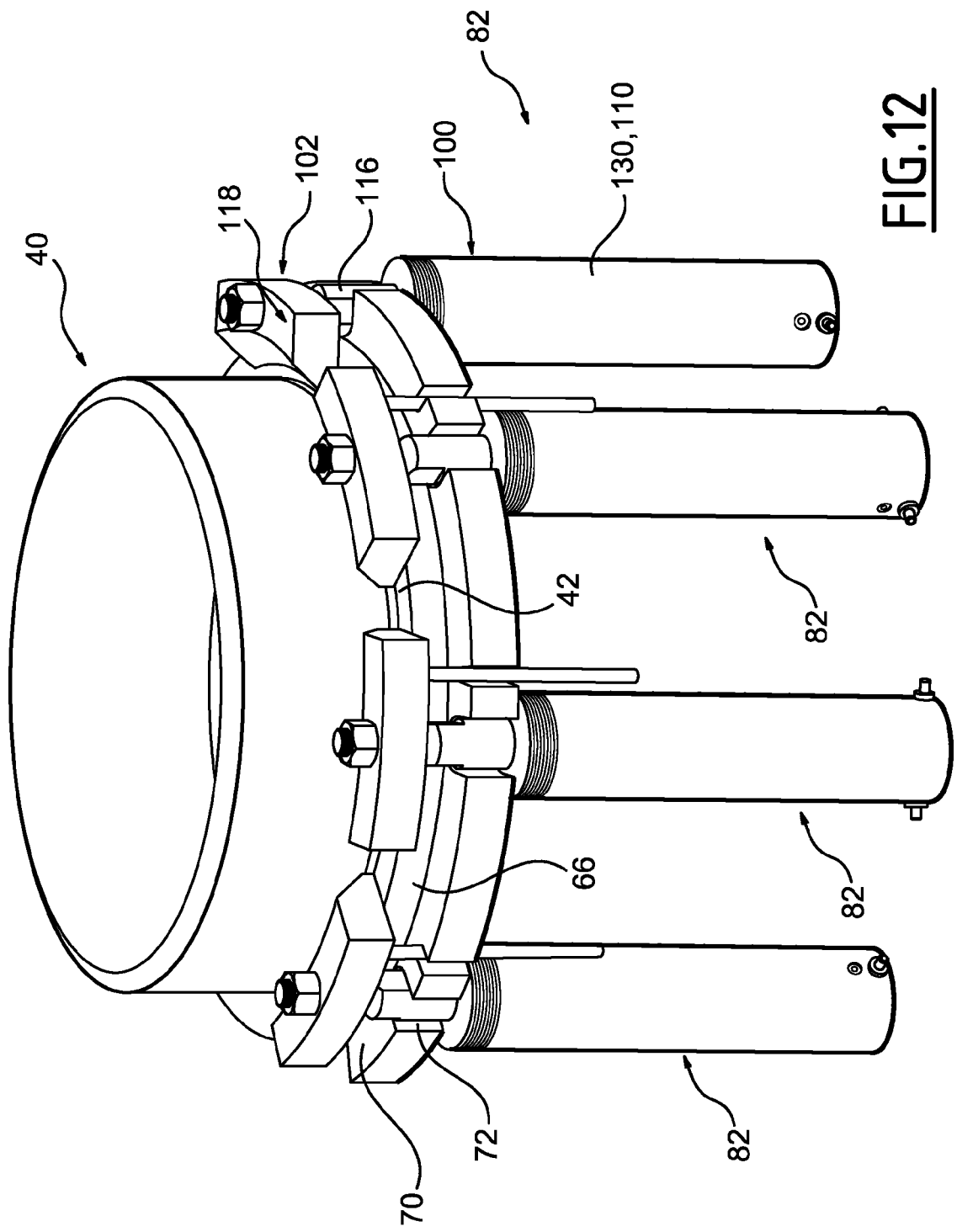
FIG. 12 is a perspective view illustrating an alternative attachment device.

In an alternative shown in FIG. 12, the self-locking system 100 is integrated into the cylinder 130 to allow increased compactness and a reduced length of the assembly formed by the catching member 102, the barrel 110, and the cylinder 130.

Such self-locking systems are associated with a cylinder 130 and are for example provided by the French company QUIRI. One example of a self-locking system 100 is described in patent application EP 0,534,879 by that company.

The operation of the attachment device 22 during the connection of the retaining element 20 on the guide tube 24 will now be described.

Initially, the flexible line 18 is deployed in the expanse of water 14 and is connected to the cable 32 of the handling vehicle 28.

To that end, the cable 32 is lowered into the guide tube 24 from its upper end 36 toward its lower end 38 and is connected on the upper end of the flexible line 18.

The retaining element 20 has been provided beforehand fixed in the vicinity of the upper end of the flexible line 18. To that end, the flexible line 18 has been inserted into the stiffener 60, the jacket 62 through the sleeve 64, then fixed axially relative to the retaining element 20 using fastening means (not shown).

The retaining element 20 is then located below the lower end 38 of the guide tube 24, axially separated from the retaining flange 40 along the vertical axis A-N.

The fastening device 22 is present on the retaining element 20. As illustrated by FIG. 5, the connection elements 82 protrude upward from the holder 80, substantially parallel to the axis A-A' of the flexible line 18. They are kept in the contracted configuration by the elastic biasing member 84.

The attachment members 102 furthermore are in their retracted position in the self-locking systems 100. The systems 100 occupy their lower position relative to the holder 80.

Then, the handling vehicle 28 is activated to raise the cable 32 entering the upper end of the flexible line 18 closer to the lower end 38 of the tube 24.

Next, the head 54 is inserted into the tube 24 through the lower end 38 of the tube 24 and is raised toward the upper end 36 of the tube 24. As illustrated in FIG. 5, the retaining element 20 then docks below the retaining flange 40.

Advantageously, the docking member 68 cooperates with the tube 24 to align the flexible line 18 and the retaining element 20 in the axis of the tube 24. Then, the lower surface 44 of the retaining flange 40 comes into contact with the upper surface 70 of the docking flange 66.

The upward movement of the cable 32 is then stopped.

Next, the hydraulic cylinder 130 of each retaining element 82 is activated to deploy each catching member 102 toward its deployed position. To that end, hydraulic pressure is supplied to the cavity 106 to expand the barrel 100 and release the rod 116.

Figure 6:
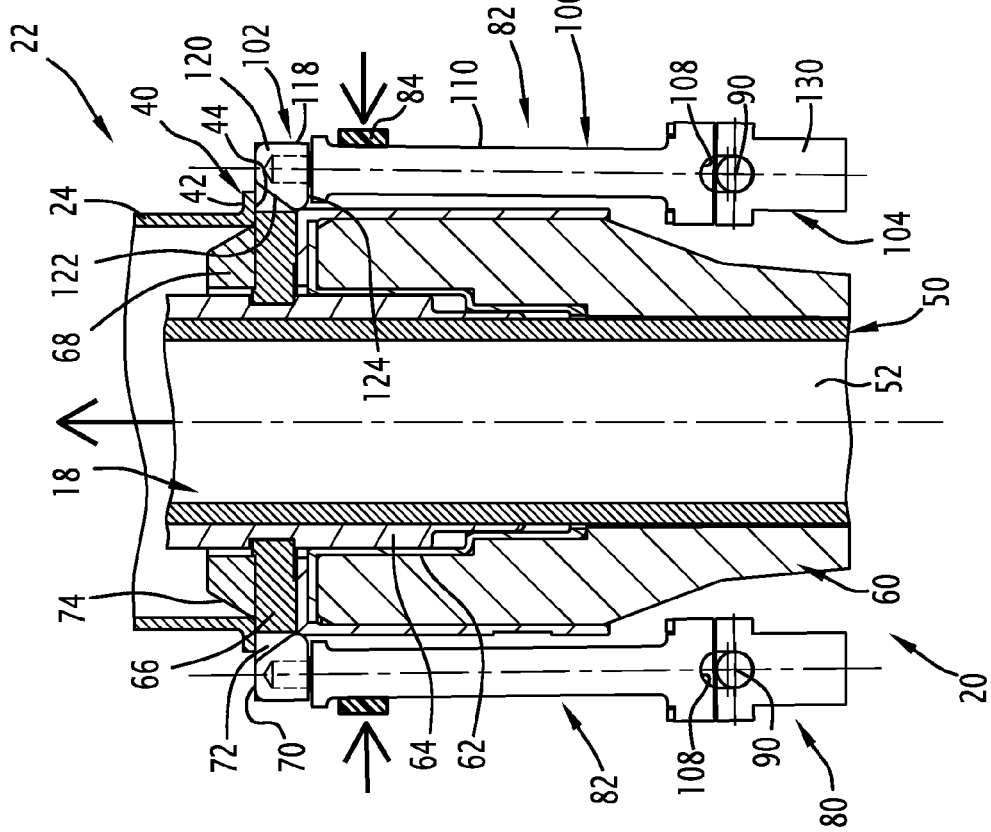
FIG. 6 is a view similar to FIG. 5 in a first connection phase of the attachment device.

The catching members 102 then move axially upward relative to the holder 80, then come into contact with the retaining flange 40. The lateral surface 122 then cooperates with the lower surface 40 to separate each catching member 102 radially from the axis A-A' by pivoting around the axis C-C' of rotation, against the elastic biasing member 84 (FIG. 6).

The heads 118 therefore pass laterally around the outer radial edge of the collar 44. Then, when the lower surface 124 of each head 118 passes above the upper surface 42, the catching members 102 are radially brought toward the axis A-A' in contact with the outer surface of the tube 24, above the skirt 40 by the elastic return created by the elastic biasing member 84 (FIG. 7) of the strap type placed on the outside and all around the retaining elements 82.

A pre-connection is then done, since the stops 102 are positioned bearing on the upper surface 42.

Next, the cylinders 130 are again activated to move each catching member 102 downward and cause it to enter its intermediate gripping position. Hydraulic pressure is then provided in the cavity 106 to expand the barrel 103 the rod 116.

The self-locking systems 100 then rise from their lower position toward their upper position to grip the catching members 102. The retaining element 20 is then firmly locked on the retaining flange 40 of the guide tube 24 between the upper surface 42 of the retaining flange 40, and the pin 90 secured to the holder 80.

The hydraulic pressure supplied by the cylinder 130 can be eliminated. To that end, the hydraulic pressure provided in the cavity 106 is eliminated to no longer expand the barrel 100 and thus lock the rod 116.

The rods 116 of the members 102 are then kept firmly in position in the barrels 110 of the self-locking systems 100.

In one alternative, the securing means (not shown) for securing the flexible line 18 on the retaining element 20 are next deactivated and the upper end of the flexible line 18 is raised to the surface to be connected on the manifold 30, the retaining element 20 remaining immobile relative to the guide tube 24.

In the case where the flexible line 18 is a fluid transport pipe, its lower end is connected to the collection means 46 on the bottom assembly 17. A continuous passage of fluid is established through the flexible line 18 from the bottom assembly 17 toward the surface assembly 16.

The attachment device 22 according to the invention therefore makes it possible to perform extremely precise locking of the retaining element 20 on the guide tube 24, in light of the distribution of the forces over the set of self-locking systems 100 associated with each connection element 82. The attachment device 22 is thus capable of bearing very significant forces (in particular regarding shearing and the moments caused by the tension of the flexible line and rigidity of the stiffener).

The attachment device 22 has improved fatigue behavior, in light of the possible pre-connection of each catching member 82 on the retaining flange 40, before final locking, owing to the pre-stressing by gripping of the two flanges 40, 66.

Figure 10:
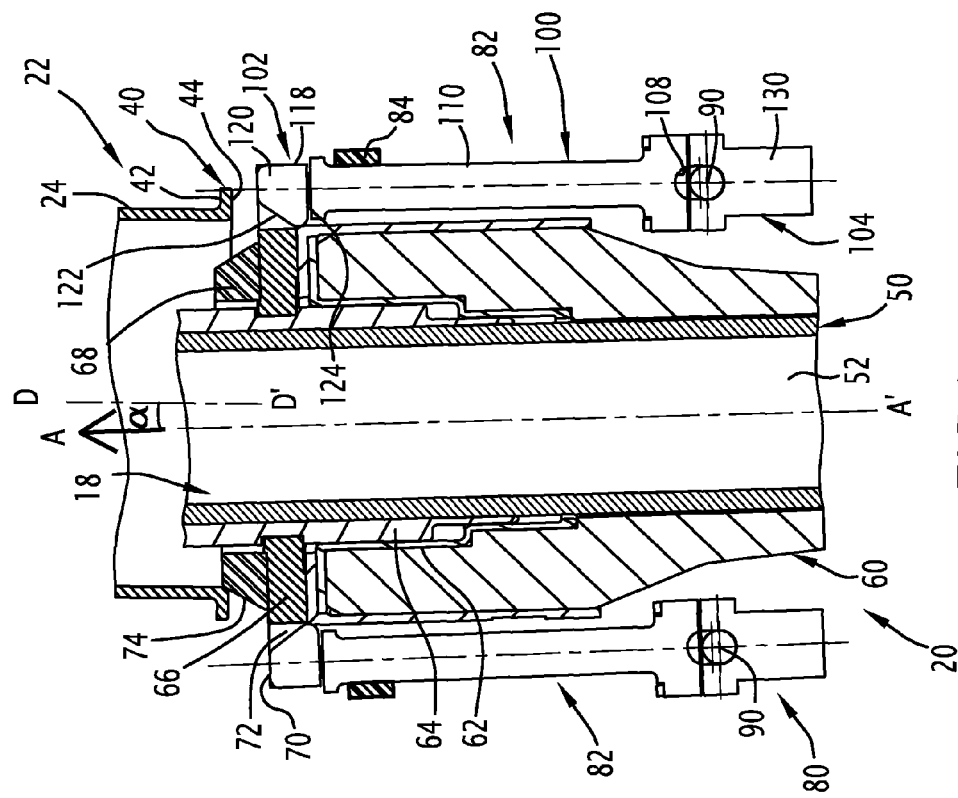
FIG. 10 is a view similar to FIG. 9 along an incline opposite that of FIG. 9.
Figure 9:
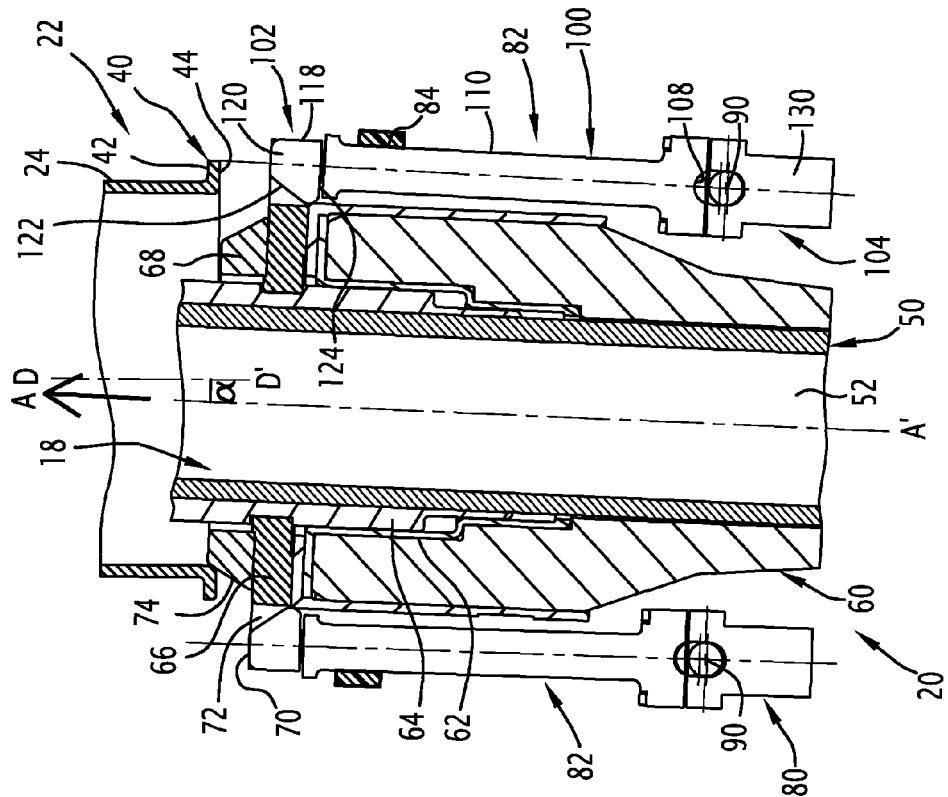
FIG. 9 illustrates an inclined docking of the stiffener at a first angle relative to the guide tube.

As illustrated in FIGS. 9 and 10, the device 22 is further capable of offsetting possible angular gaps between the axis A-A' of the flexible line 18 and the retaining element 20 and the axis D-D' of the guide tube 24, the axial gap being either in a first direction (FIGS. 9) or in a second direction (FIG. 10).

The presence of connection elements 82 including reliable hydraulic cylinders 130, like tflexible line offered by the company QUIRI, makes the connection operation particularly simple and reliable. In particular, the presence of self-locking systems, for which it is not necessary to continuously provide hydraulic pressure, makes the flanging operation particularly simple and reliable.

Furthermore, the presence of a plunger and/or a remotely controlled vehicle is not necessary in the vicinity of the lower end 38 of the tube 24, which limits the cost of the operation and makes the connection faster and more secure.

In one alternative, an inflatable cylinder (not shown) formed from a bladder is positioned in the annular space defined between the self-locking systems 100 and the outer surface of the stiffener 60. The inflatable cylinder is capable of being inflated to cause each connection element 82 to go from its retracted configuration to its separated configuration against the elastic biasing member 84. This in particular makes it possible to unlock the connection elements 82 by pushing the heads 118 radially outward away from the axis A-A'.

In another alternative (not shown), the holder 80 is mounted secured to the tube 24, the connection elements 82 protrude downward and are capable of cooperating with the retaining flange 66 present on the retaining element 20.

Figure 11:
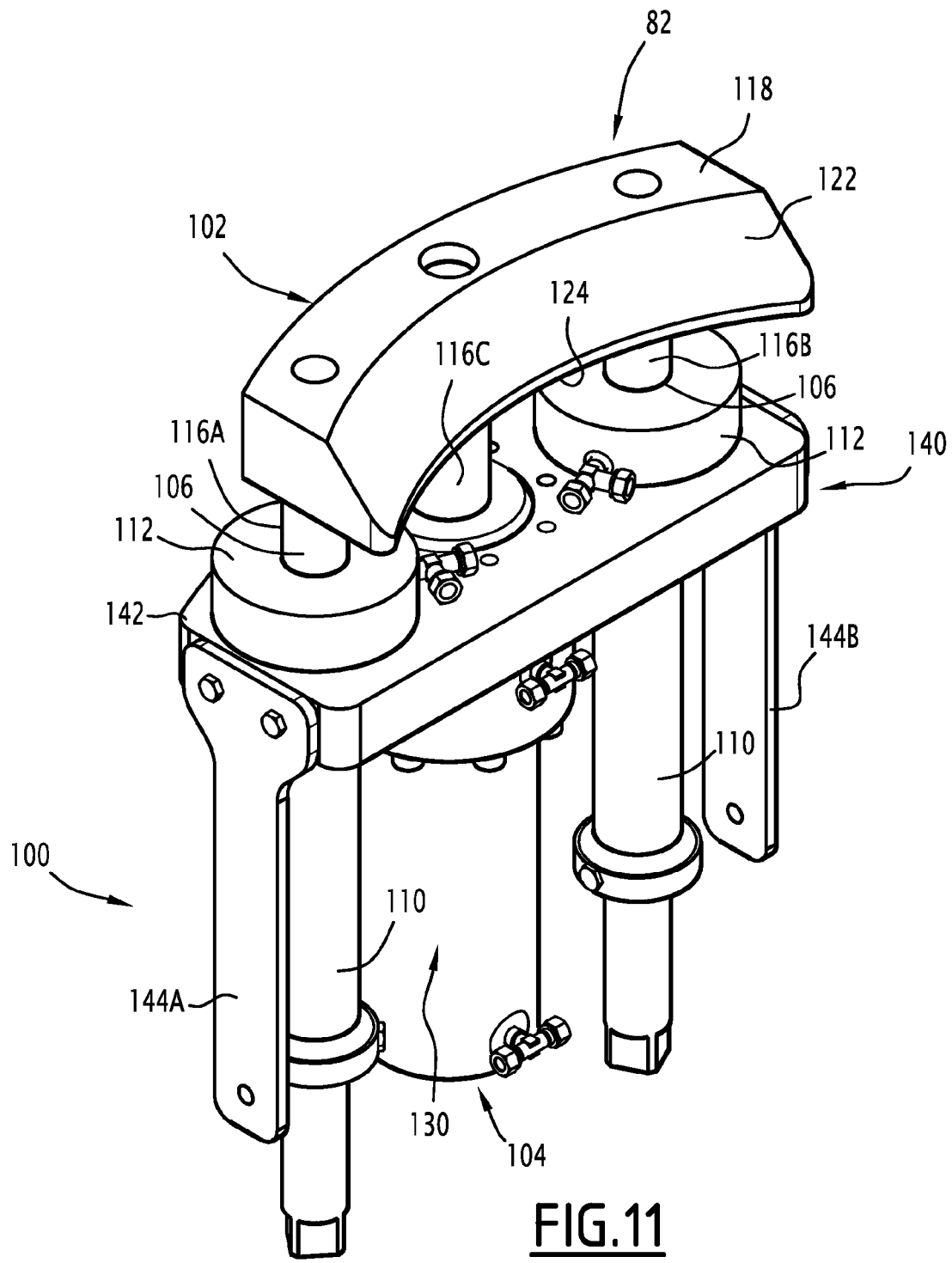
FIG. 11 is a three-quarters front perspective view of an alternative connection element for an attachment assembly according to the invention.

In another alternative, shown in FIG. 11, each connection element 82 includes a chassis 140 bearing, positioned in parallel, at least one self-locking system 100 and the cylinder 130.

In another more compact alternative (not shown), the self-locking system 100 is housed in the cylinder 130.

In the example shown in FIG. 11, the chassis 140 includes a support plate 142 and two articulated arms 144A, 144B on the holder 80.

The support plate 142 bears two barrels 110 positioned parallel to each other, each barrel 110 delimiting a cavity 106. The cylinder 130 is positioned below the support plate 142 between the two barrels 110. The cylinder holders do not react any flanging force, which remains between the catching head and the upper collar of the self-locking system.

The catching member 102 has a head in the shape of an arc of circle and multiple parallel rods 116A, 116B, 116C. The lateral rods 116A and 116B are respectively positioned in the cavities 106 of the barrels 110. The central rod 116C is positioned in the cylinder 130 to actuate the movement of the catching member 102 from its retracted position toward its deployed position. The arc-of-circle-shaped head is optimized so as to uniformly distribute the pre-stress caused by the cylinders 130 and maintained by the self-locking system 100 over the flange 40.

This device 122 decreases the length of the catching member 102, offering a particularly effective guiding of the catching member 102.

The device according to the invention has been described for attaching a stiffener on the guide tube (I-tube). However, the invention could apply to the connection by flanging of other underwater systems, for example subject to high pressures and requiring a hydraulic seal.

What is claimed is:

1. A device for axially attaching a first element to a retaining flange of a second element, the first element and the second element being intended to be submerged in an expanse of water, the device comprising:
   a holder being intended to be fixed to the first element,
   at least one connection element borne by the holder, the at least one connection element being intended to engage on the retaining flange of the second element, the at least one connection element being mounted with radial mobility in relation to the holder between a separated placement configuration and a contracted configuration for holding the at least one connection element on the second element;
   wherein the at least one connection element comprises a self-locking system and a mobile catching member, the catching member being mounted with the ability to move in the self-locking system, the attachment device comprising an actuator for moving the catching member in the self-locking system between a deployed position and a position in which it is retracted in the self-locking system,
   wherein the catching member comprises a piston-forming rod movably mounted in the self-locking system and a catching head fixed to the free end of the rod, the self-locking system by default keeping the rod of the catching member in position by mechanical cooperation.

2. The device according to claim 1, wherein one from among the first element and the second element is a flexible line retaining element advantageously including a flexible line stiffener, the other among the first element and the second element being a hollow guide tube, the holder delimiting a central space for passage of the flexible line.

3. The device according to claim 1, wherein the actuator is formed by a hydraulic cylinder.

4. The device according to claim 1, wherein the self-locking system is mounted pivotably relative to the holder between the contracted holding configuration and the separated placement configuration.

5. The device according to claim 1, including an elastic biasing member for biasing the at least one connection element toward the contracted holding configuration.

6. The device according to claim 1, wherein the self-locking system is mounted axially movably relative to the holder between a lower position and an upper position along a local axis of the holder.

7. The device according to claim 6, wherein one of the holder and the self-locking system includes a stop, the other of the holder and the self-locking system delimiting an oblong passage for receiving the stop.

8. The device according to claim 1, wherein the catching member includes an engagement head on the retaining flange of the second element, the engagement head having an inclined face capable of cooperating with a surface of the second element to move the at least one connection element away from its contracted holding configuration toward its separated placement configuration.

9. The device according to claim 1, wherein the at least one connection element comprises multiple connection elements angularly distributed around the holder.

10. The device according to claim 1, wherein the at least one connection element includes multiple self-locking systems mounted movably jointly during the passage of the at least one connection element between the separated placement configuration and the contracted holding configuration, the catching member including at least one rod received in each self-locking system.

11. An installation for exploiting a fluid through an expanse of water, comprising:
   a hollow guide tube;
   a flexible line intended to be inserted into the hollow tube, the flexible line bearing a retaining element having a retaining flange positioned at its lower end;
   a device as according to claim 1, the holder being fixed on one of the retaining element and the guide tube.

12. The installation according to claim 11, wherein the retaining element includes a docking flange intended to be kept in contact with the retaining flange, when the at least one connection is in its contracted holding configuration and when the catching member is in its retracted position.

13. A method for axially attaching a first element on a second element, including the following steps:
   providing an attachment device according to claim 1, the holder being fixed on the first element;
   bringing the first element into the vicinity of the retaining flange of the second element;
   transitioning the at least one connection element in its placement configuration into its contracted holding configuration, then moving the catching member into its retracted position, bearing on the second element.

14. The method according to claim 13, wherein when the first element is brought into the vicinity of the retaining flange of the second element, it includes the passage of the at least one connection element from the contracted configuration to the separated configuration.

15. The method according to claim 13, wherein the second element is a hollow tube.

16. The method according to claim 13, wherein the first element is an element for retaining a flexible line.

17. The device according to claim 1, wherein the at least one connection element comprises a barrel, the catching member having the rod which is kept immobile in position relative to the barrel in absence of hydraulic pressure in the barrel.

18. A device for axially attaching a first element to a retaining flange of a second element, the first element and the second element being intended to be submerged in an expanse of water, the device comprising:
   a holder being intended to be fixed to the first element,
   at least one connection element borne by the holder, the at least one connection element being intended to engage on the retaining flange of the second element, the at least one connection element being mounted with radial mobility in relation to the holder between a separated placement configuration and a contracted configuration for holding the at least one connection element on the second element;
   wherein the at least one connection element comprises a self-locking system and a mobile catching member, the catching member being mounted with the ability to move in the self-locking system, the attachment device comprising an actuator for moving the catching member in the self-locking system between a deployed position and a position in which it is retracted in the self-locking system, and
   wherein the at least one connection element comprises a barrel, the catching member having a rod which is kept immobile in position relative to the barrel in absence of hydraulic pressure in the barrel.

* * * * *